Oct. 17 1933.  C. C. DREW  1,931,286
SPECTACLE HOLDER
Filed Aug. 15, 1930
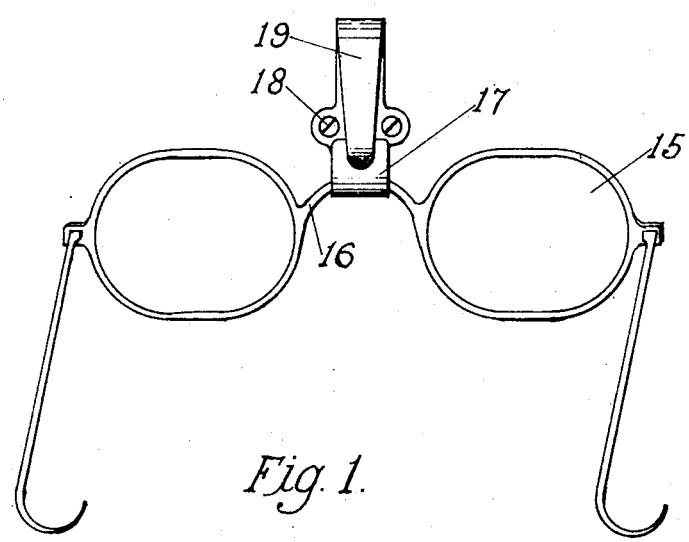
Fig. 1.
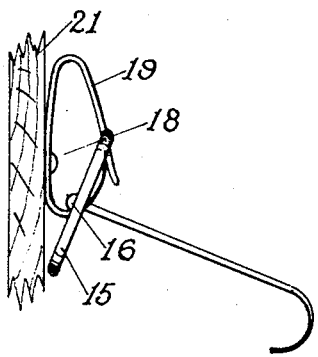   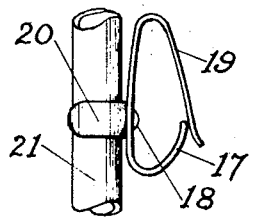   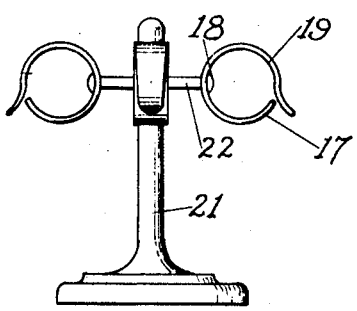
Fig. 2.        Fig. 3.        Fig. 4.
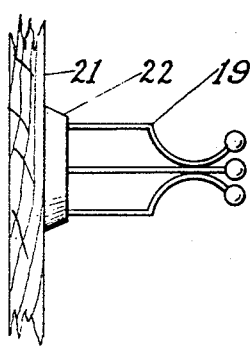   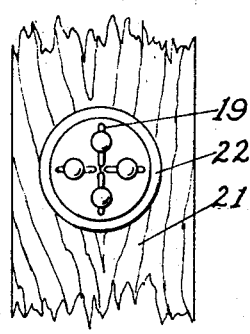
Fig. 5.        Fig. 6.
Carl C Drew
Inventor.

Patented Oct. 17, 1933

1,931,286

UNITED STATES PATENT OFFICE 1,931,286

SPECTACLE HOLDER

Carl C. Drew, Cedar Rapids, Iowa

Application August 15, 1930. Serial No. 475,555

2 Claims. (Cl. 248—23)

My invention relates to spectacle holders for use in locations about the home, office on the desk, in automobiles and the like.

An object of the invention is to provide a device for the safe holding of the spectacles. Another object is to provide a holder easily usable, conveniently placeable, durable and economical in cost. Still another object is so to construct the device as to discourage its use for any other purpose than the one designed.

In attaining these and other objects which may appear as the description proceeds I make use of simple means not unknown but in new forms and with novel, and, hitherto, not to be had results.

Illustrative of this, in the accompanying drawing I show preferred embodiments of my device. Figure 1 is a perspective view showing spectacles as hung in the spectacle holder; Figure 2 is a side view showing the device affixed to a supporting surface, as a wall, casement or the like; Figure 3 shows the holder as it would be applied by means of a spring clip to a spindle, as of a chair or bed; Figure 4 shows the holder as arranged for desk or dresser use—having a plurality of holders; Figure 5 shows the device with a plurality of prong-like members adapted to receive the spectacles in varying positions; Figure 6 is a front view showing details not seen in side view in Figure 5. More particularly, the same numerals designating similar or identical parts wherever they occur I show, a pair of spectacles 15, their bow or nose piece, 16, hung in the hook, 17, fastened to the wall support by screws, 18, and provided with a confining spring tensioned overlapping tongue, 19. The spring clip, 20, adapted to engage the spindle, 21, shows the device as applied to a spindle support. In Figure 4, 22, shows one method of providing supports for a number of the spring closed ring-like devices when more than one holder is required.

The spirit of my invention permits, manifestly, the use of a large number of forms embodying the simple principles involved the hook, latch and means for attaching to various supporting members. The recognition of so wide-spread a need leads me to claim all such forms as falling within the scope of my invention.

In operation, I suggest the use of my device freely, in a large number of locations—in the various rooms of the home, in the shop, office, automobile and other traveling compartments—everywhere spectacles are likely to be removed for attention to the needs of the face, eyes or other parts of the head. The device is especially conveniently placed upon the wall or casement near to the dressing table or lavatory. In the kitchen and where steamy heat is encountered the device finds a place. When two or more sets of glasses are used interchangeably the device provides safety and convenience. In the automobile, for the safeguarding of the colored glasses or the habitually used glasses, if temporarily not needed, the holder is of use. An especially welcome accessory to the toilet facilities in travelling conveyances near the public comfort and lavatory rooms is provided by the device. In the office, on the desk, the device finds a place—other similar uses might easily be listed.

The safety of the device commends itself for the care of the spectacles. As commonly happens, the glasses are removed and laid down upon the first support at hand whether it is safe or suitable. By accidental means the glasses are brushed off, something is laid upon them or they are hidden and hard to find. The holder affords an accustomed place, easily available and always at the same point so that habitual use makes it possible for the wearer to hang up the glasses or to regain them again with but little use of the eyes, which when the glasses are off, are usually at a great strain to see accurately if at all.

The device, as attached to the wall is formed in such a fashion as to discourage the use for any other purpose than for holding the glasses. It is so small and inconspicuous as not to be readily used to hang the towel, wash-cloth or other impedimenta which would prevent the use of the device for holding the spectacles. The sloping, and rounded and over-lapping tongue used to close the ring-like receptacle affords but little if any facilities for holding any object hung thereon but does serve as an easily found guide for the entry of the bow of the spectacles into the holder—and likewise, a guide when the glasses are to be removed. The spring-controlled action of this tongue provides capacity for receiving the various thickness of glasses having bows larger or smaller in accord with the prevailing fashion.

Simplicity is served by the possibility for one-piece construction of the device as illustrated. The hook formed by an upturned end of a strip of spring material, pierced to receive affixing screws, the other end of the strip bent to complete the spring-controlled ring-like receptacle, and to extend in overlapping engagement to afford a guide for the entry and exit of the spectacles, makes a complete whole simple, durable and economical. The bracket with a plurality of prong-like arms meeting in a common center as shown in Figures 5 and 6, provides another form in which the glasses in any position may be inserted.

Having thus described and illustrated my invention I claim:

1. A spectacle holder comprising a bracket with a vertical leg for affixing to supporting surfaces and one or more horizontally appreciably extending legs their free ends terminated by a ring-like device adapted to receive, hold and suspend spectacles by their available suspensory means free from abrasive contact with supporting surfaces; said ring-like device provided with an overlapping tongue member adaptedly serving as an insertion guide and retention control of said spectacles.

2. A spectacle holder comprising a base to set upon supporting surface such as desk or table top, with a vertical leg rising from said base, said vertical leg terminating at its free end in one or more horizontal appreciably extending legs, said horizontal leg or legs terminated at their free end by a ring-like device adapted to receive, hold and suspend spectacles by their available suspensory means free from abrasive contact with the vertical leg, base, or supporting surface; said ring-like device formed of two or more half-ring-like arms meeting at their outer extremity in tulip-like lips providing insertion guide for the spectacles, one or more of said half-ring-like arms provided with a spring, said spring or springs holding the two or more arms stoutly in the form of their ring-like position, providing retention control of said spectacles.

CARL C. DREW.